United States Patent [19]

Roobrouck

[11] Patent Number: 5,617,453
[45] Date of Patent: Apr. 1, 1997

[54] DESYNCHRONIZER AND USE OF SAME

[75] Inventor: Pascal Roobrouck, Antwerp, Belgium

[73] Assignee: Alcatel N.V., Amsterdam, Netherlands

[21] Appl. No.: 178,095

[22] Filed: Jan. 6, 1994

[30] Foreign Application Priority Data

Jan. 7, 1993 [EP] European Pat. Off. ............ 93200023

[51] Int. Cl.$^6$ ..................................................... H04L 7/00
[52] U.S. Cl. ........................ 375/367; 375/322; 375/372; 370/395
[58] Field of Search .............................. 375/1, 115, 118, 375/120, 200, 201, 208–210, 365, 366, 367, 369, 370, 206, 375, 372; 370/84, 112, 102, 38.1, 60, 60.1, 91, 100.1, 105.1, 105.4, 106, 107, 13, 16, 94.2

[56] References Cited

U.S. PATENT DOCUMENTS

| | | | |
|---|---|---|---|
| 4,891,805 | 1/1990 | Fallin | 370/95.1 |
| 5,062,105 | 10/1991 | McKnight | 370/84 |
| 5,130,975 | 7/1992 | Akata | 370/60 |
| 5,268,935 | 12/1993 | Mediavilla et al. | 375/371 |

FOREIGN PATENT DOCUMENTS 0432800  6/1991  European Pat. Off. .

OTHER PUBLICATIONS

Ruan et al. "An Improved Desynchronizer With Reduced Waiting Time Jitter For Digital TDM Systems." IEEE Pacific ROM Conference on Communications, Computers and Signal Processing, May 9–10, 1991. pp. 298–300.
Sari et al, "Jitter Reduction in SDH Network" ICC 91 International Conference on Communications 1991, 3 vol. XXIX pp. 1413–1417.
Robert W. Hamlin, Jr., "Designs & Performance Verification for a Sonet to DS3. Desynchronizer", 1991 IEEE.
"Application of the Multipath Self–Routing Switch in a Combined TM/ATM Cross–Connect System", B. Pauwels et al, *XIV International Switching Symposium*, Yokohama, Japan, Oct. 25–30, 1992, pp. 324–328.
"Technology, Distributed Control and Performance of a Multipath Self–Routing Switch", M. Henrion et al., *XIV International Switching Symposium*, Yokohama, Japan, Oct. 25–30, 1992, pp. 2–6.

*Primary Examiner*—Tesfaldet Bocure
*Assistant Examiner*—Bryan Webster
*Attorney, Agent, or Firm*—Ware, Fressola, Van Der Sluys & Adolphson

[57] ABSTRACT

The desynchronizer stores information units corresponding to time slots of a PCM-stream (IN) in consecutive memory locations of a buffer memory (BM). The number of memory locations of this memory (BM) corresponds to the length of a subframe within which the desynchronizer substantially randomizes the order of the information units. This randomization is achieved by reading the stored information units in an order dictated by a permutation (A1) of the addresses of the memory locations. This permutation (A1) is substantially randomly selected from the limited number of possible permutations by a permutation device (PM) and is started simultaneously with the arrival of the first information unit of a subframe. In order to ensure that all information units are forwarded to the output stream (OUT) the mentioned permutation is repeated (A2) by a permutation repetition device (PRM) simultaneously with a new permutation (A1) corresponding to a next subframe.

11 Claims, 1 Drawing Sheet

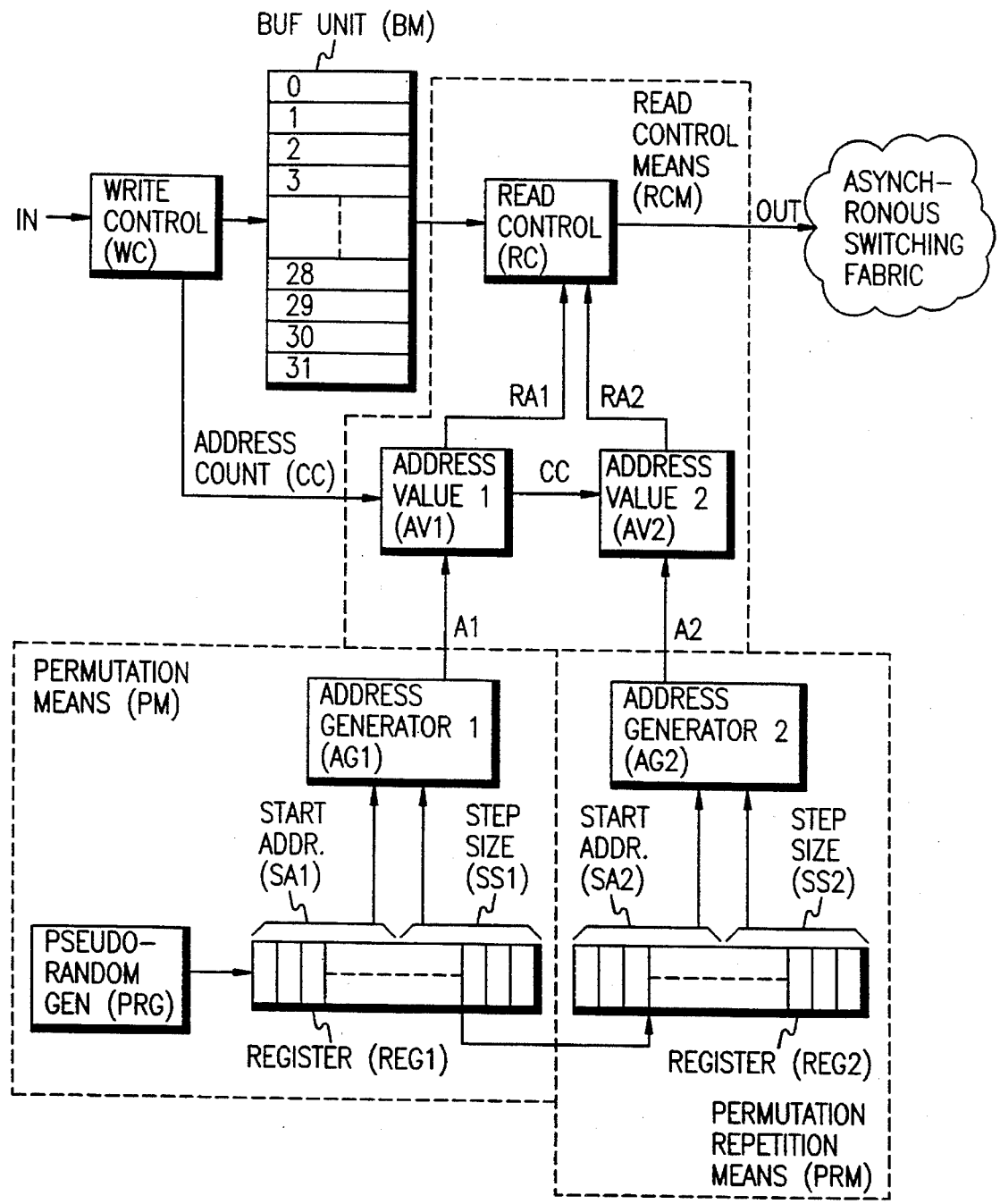

DESYNCHRONIZER AND USE OF SAME

TECHNICAL FIELD

The present invention relates to a desynchronizer for deriving from an input information stream wherein information units occur in a predetermined periodic order an output information stream wherein said information units occur in a substantially randomized order.

BACKGROUND OF THE INVENTION

Such a desynchronizer is already known in the art, e.g. from the article "Application of the multipath self-routing switch in a combined STM/ATM cross-connect system", by B. Pauwels et al., International Switching Symposium, October 1992, Yokohama, Vol. 1, pp. 324–328. Therein, the desynchronization is briefly discussed in section 3 under the heading "Contention in the switch".

As described in detail in the mentioned article, it is important for future telecommunications systems that the powerful tools developed for future packet switching networks, e.g. switching fabrics for Asynchronous Transfer Mode or ATM networks, can be also used in conjunction with other transfer modes in order to maximally use the potential of these newly developed tools. An example hereof is the use of an asynchronous switching fabric as a Synchronous Digital Hierarchy (SDH) or Synchronous Optical Network (SONET) cross-connect, in which way, a high synergy between ATM and SDH or SONET networks is achieved.

However, these asynchronous switching fabrics are optimized to cope with asynchronous traffic such as would be present in an ATM network. A basic property of asynchronous traffic is that its information rate is statistically distributed thus making it highly unlikely that an overload condition, for instance due to a number of information units simultaneously contending for a same output port of the fabric, will reoccur. However, in switching synchronous traffic through such a fabric, this overload condition, if it occurs once, will systematically reoccur with e.g. the frame rate of the synchronous traffic.

It is therefore clear that a desynchronizer is needed to break the strict synchronism of such information streams so that worst case effects are prevented from reoccurring periodically.

In the known desynchronizer this is achieved by breaking the strict order in which the information units are received and hence by deriving an output information stream in which the order of the information units is randomized. In the referenced paper these information units are parts of an SDH-frame or SONET frame which are logically linked together, i.e. which belong to a same structure within this frame, and each of which has to be transferred to a specific output port of the switching fabric.

Although the desynchronizer is not discussed in detail in the mentioned article, it is nevertheless clear that its inclusion in the telecommunications network represents an increase in network complexity and in the delay incurred by information units during their transfer.

DISCLOSURE OF INVENTION

An object of the present invention is therefore to provide a desynchronizer of the above known type with relatively low complexity and which causes a relatively low delay to the information units.

This object is achieved due to the fact that said desynchronizer includes selection means selecting from said input information stream a plurality of sequential subframes each including a predetermined number of information units, permutation means selecting in a substantially random way for each of said subframes a corresponding permutation of a set of distinct sequence tags each of which is associated to a distinct information unit, and reordering means for determining said substantially randomized order by reordering the information units included in each one of said subframes according to said corresponding permutation.

It can be verified that the reordering within the subframes is sufficient to simulate a random order if such reordering is substantially random from subframe to subframe, albeit that the synchronism present in the input information stream is not entirely broken in this way. It is moreover intuitively clear that there exists a minimal subframe length, i.e. an appropriate predetermined number, for which the output information stream is asynchronous enough. In choosing such a minimal length the delay which is clearly a function of the subframe length can also be minimized.

Moreover, reordering based on substantially randomly selected permutations has desirable statistical properties as the probability for an information unit in a particular position of a subframe to appear in a particular position of a corresponding subframe of the output stream is maximally flat. The latter means that information units in a particular position of consecutive subframes will incur a substantially random delay between the minimal and maximal delays of a desynchronizer of the above type, i.e. that within the context of reordering within subframes the synchronous relation of the input information stream is maximally broken.

It is furthermore clear that a substantially random selection of permutations can indeed be implemented with low complexity by random selection among the limited number of distinct permutations of a set having a predetermined number of elements. A random selection of one such permutation can be easily achieved in a number of ways such as e.g. randomly selecting one of a number of memory locations each storing a specific permutation.

A characteristic feature of the present invention is that said selection means includes a buffer unit with memory locations and is adapted to store all information units relating to at least one subframe in subsequent ones of said memory locations of said buffer unit, and that said reordering means is a read control means using consecutive ones of said sequence tags to address said memory locations, said permutation indicating in which sequence the locations of said buffer unit are to be read, said sequence corresponding to said random order.

A desynchronizer of this type is particularly advantageous because of its low complexity and, as will be described hereafter, because it gives the possibility to minimize both the buffer space and the delay needed in the desynchronizer.

The low complexity arises from the fact that the received information units can simply be stored in consecutive memory locations and that the reordering is achieved by directly reading those memory locations which are indicated by the sequence tags in their order of appearance in the corresponding permutation.

An alternative implementation in which the permutation indicates in which memory locations to store the information units whilst these locations are further always read in a same consecutive order is also feasible within the scope of the present invention but does not allow to be adapted to further improvements as described hereafter.

An important aspect of the present invention is that said permutation means in a first pass of one of said permutations starts forwarding said sequence tags to said read control means simultaneously with the receipt of the beginning of said corresponding subframe, that the sequence of sequence tags corresponding to said one permutation is subsequently also forwarded at least a second time in a second pass to said read control means by a permutation repetition means that said random order for said corresponding subframe corresponds to said one permutation insofar said corresponding information units are already stored in said buffer unit at the moment a corresponding sequence tag of said first pass is generated, and in that said one permutation is repeated until all said information units of said one subframe are forwarded by said desynchronizer.

Naively, any reordering of information units within a subframe would be performed only if all information units of that subframe were already available because it can otherwise not be guaranteed that an information unit is available to be forwarded. In this way, if the information units are read from the buffer unit at a same rate as they are stored in it, as will be normally the case, the maximal or worst case delay will be at least two times the time it takes for a complete subframe to be received, i.e. its duration, and the buffer unit will have to be adapted to store at least all information units according to two subframes.

According to the above aspect however, a considerable savings both with respect to buffer space and delay can be achieved by only slightly complicating the circuits for reading out the buffer unit. This is achieved thanks to the fact that the reading process is started simultaneously with the storing process thereby reducing the minimal delay to zero. The above problem with those information units not yet present when the read instruction arrives is elegantly solved by repeating the reading process based on the permutation calculated for a specific subframe so that the aforementioned units are at least forwarded by the desynchronizer pursuant to subsequent reading passes.

It can be verified, for instance from a characteristic feature of the present invention described hereafter, that the above aspect allows for the minimization of the worst case delay and needed buffer space.

This characteristic feature of the present invention is that said sequence tags are forwarded to said read control means by said permutation means and said permutation repetition means at a rate equal to the rate at which said information units are received, and that said second pass of said one permutation is forwarded simultaneously with a first pass of a next permutation corresponding to a next subframe.

In this way and as explained hereafter, it is assured that after the second pass all information units of a particular subframe are forwarded by the desynchronizer. It can moreover be easily verified that each of these information units can experience a worst case delay equal to the duration of one subframe. Indeed, if a particular information unit cannot be read during the first pass owing to the fact that its corresponding sequence tag dictates it being read before it is received, it will indeed be read when its corresponding sequence tag is repeated in the second pass after exactly one such duration.

The buffer space can moreover be minimized to equal the space needed to store all information units of one subframe since an information unit of a previous subframe will always be read before an information unit occupying a same position in a next subframe, and hence a same memory location, will have to be stored. The latter fact can again be easily verified from the above fact that the worst case delay is equal to the duration of a subframe. An information unit destined for a same memory location as a previous information unit will indeed be received exactly after one duration of a subframe whilst the previous unit will maximally be stored in this memory location for one such duration so that in any case the location will be freed before the new information unit arrives.

It is to be noted that the above reordering scheme leads to very desirable statistical properties which are sufficient for instance for the earlier mentioned application involving an ATM switch fabric.

It has to be noted that the output information stream will, in the above scheme, have to be applied to a transmission link having a higher bandwidth capability than the bandwidth of the input information stream. Indeed, due to the fact that two reading processes are provided in parallel, i.e. a first pass relating to the presently received subframe and a second pass relating to the previous subframe, two information units could contend for the output port of the desynchronizer. However, such contention can be easily solved by providing a transmission link as mentioned above which in no way restricts the application of the present invention since input links to for instance ATM switching fabrics are always overdimensioned in order not to overload these fabrics.

Still another important aspect of the present invention is that said set of sequence tags comprises the consecutive numerals from zero to said predetermined number minus one and that said permutation means includes at least one pseudo random generator generating for each subframe a start sequence tag and a step value for said corresponding permutation respectively, and that said corresponding permutation is generated by an address generation circuit by calculating consecutive sequence tags starting from said start sequence tag and proceeding with said step value through said consecutive numerals counting modulo said predetermined number, and that both said start sequence tag and said step value are smaller than said predetermined number and that said step value is not an integer multiple of a divider of said predetermined number.

This way of substantially randomly selecting the permutations is particularly efficient and advantageous in itself. Indeed, in this way intelligent use is made of well known and simple pseudo random generators in order to generate one of the limited number of distinct permutations in a substantially random way whilst achieving the desired flat delay statistic for every information unit.

The present method of generating such random permutations indeed does not need a memory storing all possible permutations whilst giving in a computationally direct way an on-line generation of the permutations using well known and very simple hardware as will be explained later.

A feature of the present invention is that said information stream is a PCM-stream, each of said information units being the information sent in a particular time slot of a PCM-frame.

The known application of such a desynchronizer as evidenced by the referenced article is by no means exclusive. A more important application for instance being, in a basic Synchronous Transfer Mode or STM telephony network using synchronous time division multiplexed transmission and also synchronous switching, the replacement of a synchronous switching fabric by an asynchronous one. The importance here stems from the fact that a gradual introduction of the asynchronous transfer mode is needed in order to make its introduction economically feasible. Such a gradual introduction can for instance elegantly be achieved by first replacing synchronous switching fabrics with asynchronous switching fabrics. As can be verified from the above such replacement requires the synchronous traffic to be randomized before it is applied to the switching fabric by way of a desynchronizer of the above known type.

It can hence be clearly seen that a desynchronizer used in such a network allows for the gradual introduction of asynchronous transfer mode, as a synchronous network of the above type, i.e. including desynchronizers and asynchronous switching fabrics, can be easily adapted thereto by simply omitting desynchronizers at input ports directly receiving asynchronous data.

These and other objects, features and advantages of the present invention will become more apparent in light of the following detailed description of a best mode embodiment thereof, as illustrated in the accompanying drawing.

BRIEF DESCRIPTION OF THE DRAWING

The sole FIGURE shows a schematic diagram of a desynchronizer, according to the present invention.

BEST MODE FOR CARRYING OUT THE INVENTION

The input information stream IN applied on a like named terminal of the desynchronizer of the figure is a PCM stream consisting for instance of frames of 32 channels each carrying an information unit, a PCM frame being thus a time multiplex of 32 information units. As all aspects of such PCM streams and frames are very well known in the art they will not be described in further detail. It suffices to point out that such information units included in the PCM stream arrive at regular instances and are therefore synchronous with a data clock and that an information unit contained in a particular channel transmitted over a PCM transmission link appears always in a same position within a PCM frame. From the above it obviously follows that information units belonging to a particular channel are also synchronous with the mentioned data clock.

The desynchronizer supplies an output stream OUT via like named links to an asynchronous switching fabric such as e.g. the one described in the article "Technology, distributed control and performance of a multipath self-routing switch", by M. A. Henrion et al., International Switching Symposium, October 1992, Yokohama, Vol. 2, pp. 2–6 and developed for switching asynchronous traffic of Asynchronous Transfer Mode or ATM networks. In this switching fabric no permanent connections between its input ports and output ports are established meaning that every information unit is switched independently through the network thereby providing the advantage of distributing the load on the fabric as much as possible over its internal links. In such switching fabrics contention and corresponding information loss can occur when too many information units are destined to a same part of the fabric at the same time. The latter information loss in switching asynchronous traffic is normally very low as such extreme overload conditions occur very rarely and also because the repetition of such overload conditions is itself very rare thanks to the statistical distribution of the information rate of such asynchronous traffic. In designing the fabric the above drawback can be diminished to such an extent that it doesn't appreciably affect the quality of service of the connections switched by the fabric.

It is to be noted that the present desynchronizer may be used in conjunction with any type of asynchronous switching fabric generally based on the idea of statistical multiplexing, i.e. handling more traffic than what worst case calculations would allow.

Nevertheless, if a plurality of PCM streams are switched through the asynchronous switching fabric and if such a contention problem occurs once, it will reoccur periodically due to the periodicity of the traffic carried by such PCM streams. This problem will moreover always effect the same channels in these streams. Because such contention can never be entirely avoided in asynchronous switching fabrics, switching synchronous, e.g. PCM, traffic through these fabrics is clearly not feasible without additional measures being taken. The desynchronizer solves this problem by efficiently deriving the output information stream OUT from the input stream IN in such a way that the synchronism of this input stream IN is sufficiently broken to avoid such problems, i.e. to prevent overload conditions from periodically reappearing, thereby making it possible to gradually introduce technology dedicated to ATM networks in existing telecommunications networks.

The desynchronizer derives the output stream OUT from the input stream IN in the following way.

As already mentioned this input information stream IN comprises periodically occurring frames of 32 channels each of which contains one information unit and occurs in a predetermined position within the frame. This stream IN is applied to a write control unit WC writing consecutive information units of IN in successive memory locations of a buffer unit BM. This buffer unit BM includes 32 consecutively numbered memory locations each of which is capable of storing exactly one information unit. Since the write control unit WC writes successively received information units in successive memory locations of BM, each of these memory locations is dedicated to the information unit of a distinct one of the 32 channels and subsequent memory locations are dedicated to subsequent channels in the PCM frame. These memory locations are therefore numbered according to the channel to which they are dedicated and each of these numbers indicates the position of the information unit or channel within a frame.

The write control unit WC for instance calculates these consecutive addresses by means of a modulo 32 counter (not shown) included therein. The address CC thus provided is applied via a like named terminal to address validation circuits AV1 and AV2 described in detail below.

The desynchronizer is generally adapted to reorder information units within subframes carrying a predetermined number of such information units, e.g. 8 or even 64. Whilst in the present embodiment this predetermined number is chosen to be 32, i.e. equal to the number of units in one PCM-frame, this does not necessarily imply that subframes coincide with the PCM frames as the desynchronizer may be activated at any point within a PCM frame. Therefore the first information unit of a subframe considered by the desynchronizer generally is not the first unit of a PCM frame. However, for clarity's sake the present discussion will assume that subframes do coincide with PCM frames and therefore also subframes will generally be referred to as frames.

The information units thus stored in the buffer unit BM are read out by a read control unit RC. This read control unit RC reads the information units from the memory locations whose addresses, RA1 and RA2, are supplied by the address validation circuits AV1 and AV2 respectively. RC together with AV1 and AV2 constitute a read control means RCM which determines when and from which memory location of BM information units have to be read.

The read addresses RA1 and RA2 include a read enable part which is reset if no information unit corresponding to a particular read address should be read as explained in detail later. Under the control of the address count CC, these enable parts are derived by respective ones of the address validation circuits AV1 and AV2, whereas the corresponding effective addresses A1 and A2 are computed by address generation circuits AG1 and AG2 respectively. These addresses A1 and A2 are applied via like named terminals to AV1 and AV2 respectively.

The generation of these addresses will be described in detail hereafter. The desynchronizer is initialized by initializing the shift register incorporated in a pseudo random generator PRG. This pseudo random generator PRG generates a pseudo random sequence and may be any linear feedback shift register commonly used to generate a suitably long pseudo random sequence. PRG is not described in further detail because such generators are very well known in the art.

Once initialized the pseudo random generator shifts consecutive bits in a register REG1 at a rate which is such that REG1 is filled with newly generated bits within the time needed to receive one PCM frame, e.g. 125 μsec. Once REG1 is thus filled the address generator AG1 reads the content of REG1, via lines SA1 and SS1, and interprets a first part of the content as a start address SA1 and a second part as a step size SS1. AG1 computes therefrom consecutive sequence tags each of which is a number between 0 to 31 and corresponds to an address A1 as described above. These consecutive sequence tags form a permutation of the numbers 0 to 31, as will be described later in connection to the operation of AG1 and AG2, and are transferred consecutively over A1 to the address validation circuit AV1. These sequence tags are generated at a rate equal to the arrival rate of the information units at terminal IN so that a complete permutation is produced exactly in the time needed to receive one PCM frame. A permutation is hence generated on terminal A1 by a permutation means PM including PRG, REG1 and AG1.

In the meanwhile the bits stored in REG1 are further shifted into a register REG2 and new bits generated by PRG are shifted into REG1. In this way both registers are filled also exactly in the time needed to receive one PCM frame. It is to be noted that in so doing and after the mentioned 125 μsec period has elapsed, REG2 contains precisely the same bits as REG1 at the start of this period.

From this moment on the desynchronizer iterates the same steps over and over at the frame rate. At the beginning of each frame REG1 contains a new start address SA1 and step size SS1 as generated by PRG and REG2 contains the start address SA2 and the step size SS2 equalling those contained in REG1 exactly a 125 μsec frame period before.

Every iteration step then starts with loading AG1 with SA1 and SS1 via the like named terminals and loading AG2 with SA2 and SS2 also via like named terminals. Both address generators AG1 and AG2 then generate consecutive sequence tags or addresses A1 and A2 the generation of which will be explained in detail later. From the above it can be verified that during a frame period a same permutation is applied on A2 as on A1 during a previous frame period and therefore REG2 and AG2 can be seen as a permutation repetition means PRM.

The operation of the desynchronizer will now be explained in detail in describing an example in which the desynchronizer is activated so that WC stores the first information unit of a PCM frame in the first memory location of BM, this first information unit therefore coincides with the first information unit of a subframe. As described hereafter RC will in the present embodiment attempt to read a first information unit simultaneously with the above first storage at which moment also, and as described above, PRG has stored in REG1 a start address or first sequence tag SA1 and a step size SS1, both being applied to AG1.

AG1 then starts computing from SA1 and SS1 consecutive sequence tags or addresses A1 at a rate equal to the arrival rate of the information units. The first sequence tag A1 is equal to the start address SA1 and is thus supplied to AV1. The next sequence tag A1 is generated by AG1 by adding SS1 to SA1 modulo 32 and is also supplied to AV1. The latter sum is stored as an intermediate value by AG1 and all further first sequence tags A1 are calculated by AG1 by adding the step size SS1 to the intermediate value which is the sum in the previous step.

It can be easily verified that when the step size used in combination with subframes of 32 information units is odd the above procedure leads to 32 consecutive sequence tags which represent a permutation of the numbers from 0 to 31. This constraint on the value of the step size is needed because, generally, a step size which is an integer multiple of a divider of the predetermined number representing the subframe length will cause the modulo count to reach its start value after less than a predetermined number of additions in which case clearly no permutation is generated.

Due to the fact that both the start address and the step size are generated by PRG in a substantially random way, it can be easily verified that consecutive permutations thus computed correspond permutations selected in a substantially random way from the limited number of distinct permutations of the numbers from 0 to 31. In this respect it has also to be noted that in order for the step size to be odd AG1 will have to compute the actual step size from SS1 as supplied by REG1 because a random number can generally not be constrained to be odd when generated by a linear feedback shift register.

As already mentioned every sequence tag or address A1 is supplied to the address validation circuit AV1 which compares this sequence tag, which will be later used to address a memory location of BM, with the present value CC of the address count generated by the write control unit WC. As is clear from the above, CC indicates in which memory location the last information unit was stored. Hence, if A1 is larger than CC the information unit indicated by this particular sequence tag is not yet available and AV1 will generate a read address RA1 which disables a read operation of RC. In all other cases AV1 will enable RC via RA1 to read the information unit stored in the memory location having the address A1 and the latter is therefore sent to RC via RA1.

It is clear that in the above way it cannot be guaranteed that within a first pass of said permutation all information units of the frame are transferred to OUT because at least some of these information units will be received later than when their associated sequence tag is processed by AV1. In order to read also those units which were not read in the first pass, the parallel branch constituted by REG2, AG2 and AV2 is controlled to generate an identical permutation in a second pass simultaneously with the arrival on the input IN of the units of the next frame.

To this end, at the beginning of the next frame, REG2 is controlled to contain the previous values of SA1 and SS1, for instance by stepwise shifting the data stored in REG1 into REG2 upon the occurrence of every bit newly generated by PRG and stored in REG1. At the end of a new frame period REG1 thus contains a totally new sequence of bits generated by PRG as a consequence of which AG1 is loaded with a new start address SA1 and a new step size SS1 whilst AG2 is loaded with a start address SA2 and a step size SS2 which equal the previous SA1 and SS1 respectively. Both AG1 and AG2 then simultaneously generate consecutive sequence tags A1 and A2 as described above.

AV1 takes the address count CC into account in exactly the same way as described above, whilst AV2 operates analogous with AV1 but disabling RC with respect to the second read address RA2 if CC is smaller than or equal to the current value of the sequence tag A2. It can be verified that in so doing those information units of the previous frame which were not read during the first pass appear on OUT.

The above operation is iteratively repeated with a new SA1 and SS1 generated by PRG for every new frame received on IN.

It is to be noted that in the above way the worst case delay for an information unit in the buffer unit BM exactly equals the duration of one subframe, i.e. the 125 μsec frame period in the present case. Indeed, this worst case occurs when a particular information unit is received exactly after its corresponding sequence tag A1 has been applied to AV1, it being then guaranteed through the repetition of the permutation in the second pass that this sequence tag reappears, now applied to AV2 via A2, exactly 125 μsec later.

From the above it is also clear that in the above desynchronizer no information unit can be overwritten with a new unit before being transferred to OUT. Indeed, since the worst case delay in BM is 125 μsec and because this is also the time elapsing between two occurrences on IN of information units destined for a same memory location of BM, a buffer unit having as many locations as there are information units in a frame suffices for this desynchronizer since any information unit will already have been transferred to OUT at the moment a next information unit destined for the same memory location is received.

It has to be noted that it may happen that both RA1 and RA2 are simultaneously enabled so that two information units may then contend for the output OUT of the desynchronizer. To resolve this problem this output OUT should have a bandwidth capacity larger than that strictly required for the input information stream IN. In this way, the above contention which essentially corresponds to a temporary increase in the peak data rate at the output of the desynchronizer can be coped with.

The last mentioned feature generally does not limit the feasibility of the desynchronizer as it will generally be used at the inputs of an asynchronous switching fabric whose inputs are normally overdimensioned anyway with respect to the information rates expected to occur thereon.

It is finally to be noted that a simple but useful extension of the above principle is the simultaneous desynchronization of multiple PCM-streams. In this case desynchronization may for instance be achieved by writing information units arriving simultaneously within distinct PCM-streams in consecutive memory locations for a number of consecutive information units. In this way and dependent upon the size of the buffer memory BM, it can be achieved that a subframe includes eight consecutive information units of each one of four distinct PCM-streams. It can be verified that the desynchronizer can perform satisfactory also in this case.

While the principles of the invention have been described above in connection with specific apparatus, it is to be clearly understood that this description is made only by way of example and not as a limitation on the scope of the invention.

I claim:

1. Desynchronizer responsive to an input information stream having information units which occur in a predetermined periodic order, the input information stream being provided at an input of the desynchronizer, for deriving an output information stream having information units which occur in a substantially randomized order, the output information stream being provided at an output of the desynchronizer, said desynchronizer including:

selection means for selecting from said input information stream a plurality of sequential subframes each including a predetermined number of said information units which occur in a predetermined periodic order, permutation means for selecting in a substantially random way for each of said selected sequential subframes a corresponding permutation of a set of distinct sequence tags each of which is associated with a distinct one of the predetermined number of said information unit which occur in a predetermined periodic order, and reordering means for determining said substantially randomized order by reordering the predetermined number of said information units which occur in a predetermined periodic order included in each one of said selected sequential subframes according to said corresponding permutation.

2. Desynchronizer according to claim 1, wherein said selection means includes a buffer unit with memory locations and is adapted to store all of said information units which occur in a predetermined periodic order relating to at least one subframe in subsequent ones of said memory locations of said buffer unit, and that said reordering means is a read control means using consecutive ones of said sequence tags to address said memory locations, said permutation indicating in which sequence the locations of said buffer unit are to be read, said sequence corresponding to said substantially randomized order.

3. Desynchronizer according to claim 1, wherein said set of sequence tags comprises consecutive numerals from zero to said predetermined number minus one, and that said permutation means includes at least one pseudo random generator generating for each subframe a start sequence tag and a step value for said corresponding permutation respectively, and that said corresponding permutation is generated by an address generation circuit by calculating consecutive sequence tags starting from said start sequence tag and proceeding with said step value through said consecutive numerals counting modulo said predetermined number, and wherein both said start sequence tag and said step value are smaller than said predetermined number and wherein said step value is not an integer multiple of a divider of said predetermined number.

4. Desynchronizer according to claim 3, wherein said pseudo random generator is a linear feedback shift register, and that said predetermined number is a power of two and said step value is odd.

5. Desynchronizer according to claim 2, wherein said permutation means in a first pass of one of said permutations starts forwarding said sequence tags to said read control means simultaneously with the receipt of the beginning of said at least one subframe, that the sequence of sequence tags corresponding to said one of said permutations is subsequently also forwarded at least a second time in a second pass to said read control means by a permutation repetition means, wherein said random order for said at least one subframe corresponds to said one of said permutations insofar as said information units which occur in a predetermined periodic order related to said at least one subframe are already stored in said buffer unit at the moment a corresponding sequence tag of said first pass is generated, and wherein said one of said permutations is repeated until all said information units which occur in a predetermined periodic order related to said at least one subframe are forwarded by said desynchronizer.

6. Desynchronizer according to claim 5, wherein said sequence tags are forwarded to said read control means by said permutation means and said permutation repetition means at a rate equal to the rate at which said information units which occur in a predetermined periodic order are received, and wherein said second pass of said one of said permutations is forwarded simultaneously with a first pass of a next permutation corresponding to a next subframe.

7. Desynchronizer according to claim 1, wherein said input information stream is a PCM-stream, each of said information units which occur in a predetermined periodic order being the information sent in a particular time slot of a PCM-frame.

8. Desynchronizer according to claim 1, wherein said desynchronizer is adapted to derive from a plurality of input information streams a plurality of output information streams, said permutation means selecting one permutation for all corresponding subframes of said input information streams.

9. A desynchronizing method, comprising the steps of:
converting a synchronous time division multiple access input information stream having information units which occur in a predetermined periodic order into a substantially asynchronous output information stream having information units which occur in a substantially randomized order, including:
selecting from said input information stream a plurality of sequential subframes each including a predetermined number of said information units which occur in a predetermined periodic order,
selecting in a substantially random way for each of said selected sequential subframes a corresponding permutation of a set of distinct sequence tags each of which is associated with a distinct one of the predetermined number of said information unit which occur in a predetermined periodic order, and
determining said substantially randomized order by reordering the predetermined number of said information units which occur in a predetermined periodic order included in each one of said selected sequential subframes according to said corresponding permutation; and
forwarding said asynchronous output information stream to an asynchronous switching fabric.

10. Desynchronizer according to claim 2, wherein said set of sequence tags comprises consecutive numerals from zero to said predetermined number minus one, and that said permutation means includes at least one pseudo random generator generating for each subframe a start sequence tag and a step value for said corresponding permutation respectively, and that said corresponding permutation is generated by an address generation circuit by calculating consecutive sequence tags starting from said start sequence tag and proceeding with said step value through said consecutive numerals counting modulo said predetermined number, and wherein both said start sequence tag and said step value are smaller than said predetermined number and wherein said step value is not an integer multiple of a divider of said predetermined number.

11. Desynchronizer according to claim 10, wherein said pseudo random generator is a linear feedback shift register, and that said predetermined number is a power of two and said step value is odd.

* * * * *